(12) United States Patent
Li et al.

(10) Patent No.: US 10,665,826 B2
(45) Date of Patent: May 26, 2020

(54) TOP COVER ASSEMBLY OF SECONDARY BATTERY AND SECONDARY BATTERY

(71) Applicant: Contemporary Amperex Technology Co., Limited, Ningde, Fujian Province (CN)

(72) Inventors: Xiang Li, Ningde (CN); Rulai Cai, Ningde (CN); Xianfeng Yu, Ningde (CN); Peng Wang, Ningde (CN); Quankun Li, Ningde (CN)

(73) Assignee: Contemporary Amperex Technology Co., Limited (CN)

( * ) Notice: Subject to any disclaimer, the term of this patent is extended or adjusted under 35 U.S.C. 154(b) by 250 days.

(21) Appl. No.: 15/871,463

(22) Filed: Jan. 15, 2018

(65) Prior Publication Data

US 2019/0074486 A1  Mar. 7, 2019

(30) Foreign Application Priority Data

Sep. 7, 2017 (CN) .................... 2017 2 1142507 U

(51) Int. Cl.
| | |
|---|---|
| *H01M 2/04* | (2006.01) |
| *H01M 2/34* | (2006.01) |
| *H01M 10/02* | (2006.01) |
| *H01M 2/30* | (2006.01) |
| *H01M 2/12* | (2006.01) |

(52) U.S. Cl.
CPC ............. *H01M 2/04* (2013.01); *H01M 2/30* (2013.01); *H01M 2/345* (2013.01); *H01M 10/02* (2013.01); *H01M 2/1241* (2013.01); *H01M 2200/00* (2013.01)

(58) Field of Classification Search
CPC ........ H01M 2/04; H01M 2/34; H01M 2/0473; H01M 2/043; H01M 2/345
See application file for complete search history.

(56) References Cited

U.S. PATENT DOCUMENTS

| | | | |
|---|---|---|---|
| 2012/0100404 A1 | 4/2012 | Kim et al. | |
| 2017/0077485 A1 | 3/2017 | Fujiwara et al. | |
| 2017/0352846 A1* | 12/2017 | Li | ............ H01M 2/043 |
| 2018/0166666 A1* | 6/2018 | Chen | ............ H01M 2/0212 |

FOREIGN PATENT DOCUMENTS

CN      105845851 A      8/2018

\* cited by examiner

*Primary Examiner* — Karie O'Neill Apicella
(74) *Attorney, Agent, or Firm* — Forge IP, PLLC

(57) ABSTRACT

Provided are a top cover assembly and a secondary battery containing the same. The top cover assembly includes a cover plate, and a first terminal assembly; the top cover plate includes a main body and a protrusion connected to the main body, the protrusion protrudes beyond an upper surface of the main body, an accommodation chamber is defined below the protrusion, the protrusion faces the accommodation chamber, the first terminal assembly includes a deformable plate, and the deformable plate is connected to the top cover plate and covers the accommodation chamber. Such solution can sufficiently utilize the space between the upper surface of the top cover plate and the upper surface of the second terminal assembly, improve the space utilization of the secondary battery, improve the deformation resistance of the top cover plate and the strength of the top cover plate, and keep the secondary battery safe.

10 Claims, 4 Drawing Sheets

TOP COVER ASSEMBLY OF SECONDARY BATTERY AND SECONDARY BATTERY

CROSS-REFERENCE TO RELATED APPLICATIONS

The present application claims priority to Chinese Patent Application No. 201721142507.6, filed on Sep. 7, 2017, the content of which is incorporated herein by reference in its entirety.

TECHNICAL FIELD

The present application relates to the technical field of energy storage devices and, particularly, relates to a top cover assembly of a secondary battery and a secondary battery.

BACKGROUND

In order to solve the overcharge problem of the secondary battery, the commonly adopted solution is to cut off the main circuit of the battery before the electrode assembly fails so that the further charge of the electrode assembly will be prevented and then the secondary battery will be kept safe. Generally, an upper surface of the top cover plate is a flat surface, a through hole is defined through the top cover plate, and a deformable plate is welded to the inside of the top cover plate and covers the through hole.

In the related art, the secondary battery further includes a second terminal assembly protruding beyond the top cover plate, and the portion of the second terminal assembly beyond the upper surface of the top cover plate has a relatively great height. In order to facilitate series or parallel connection of the secondary batteries by using a current collection member after the secondary batteries are assembled into a module, a conduction block is generally used and, specifically, the conduction block is welded to the external side of the top cover plate and covers the through hole, and the upper surface of the conduction block is substantially even with the upper surface of the second terminal assembly. However, the conduction block is merely used for conducting electricity and filling the space between the upper surface of the top cover plate and the upper surface of the second terminal assembly (i.e., said space has poor utilization), thus, the energy density of the secondary battery cannot be further improved. In addition, the welding of the conduction block may generate residue welding stress that is applied to the deformable plate, which caused that the deformation force of the deformable plate deviates from a preset value, influencing the safety performance of the secondary battery.

SUMMARY

The present application provides a top cover assembly of a secondary battery, and a secondary battery, which can solve the above-mentioned problem.

A first aspect of the present application provides a top cover assembly of a secondary battery, including: a cover plate, the top cover plate including a main body and a protrusion connected to the main body, the protrusion protruding beyond an upper surface of the main body, an accommodation chamber being defined below the protrusion, the protrusion facing the accommodation chamber; and a first terminal assembly, the first terminal assembly including a deformable plate, the deformable plate being connected to the top cover plate and covering the accommodation chamber.

Preferably, the first terminal assembly further includes a conduction piece and an insulation piece, the conduction piece is insulated from and fixed with the top cover plate by the insulation piece; the conduction piece is electrically connected to the deformable plate; and the deformable plate is configured to deform in response to an increase of an internal pressure of the secondary battery, to break the conduction piece or cut off an electric connection state between the deformable plate and the conduction piece.

Preferably, the first terminal assembly further includes a fixing piece, and the insulation piece is fixed to the top cover plate by the fixing piece.

Preferably, the deformable plate includes a fixed portion and a deformable portion, the fixed portion is fixed to the top cover plate, and the deformable portion protrudes downwards.

Preferably, the protrusion includes a top portion and a side portion, the side portion is connected between the main body and the top portion, a first groove is defined in an internal wall of the side portion, and the fixed portion is accommodated in the first groove.

Preferably, the first terminal assembly further includes a fixing piece, the insulation piece is fixed to the top cover plate by the fixing piece, a second groove is defined in the internal wall of the side portion, the fixing piece is accommodated in the second groove, and the second groove surrounds the first groove and is located below the first groove.

Preferably, a bottom surface of the second groove is higher than the upper surface of the main body.

Preferably, the conduction piece is at least partially accommodated in the accommodation chamber, and the insulation piece is at least partially accommodated in the accommodation chamber.

Preferably, the protrusion and the accommodation chamber are formed by stamping, and the deformable plate is at least partially accommodated in the accommodation chamber.

Preferably, the top cover assembly further including a second terminal assembly, wherein the second terminal assembly protrudes beyond the top cover plate, and an upper surface of the protrusion is not higher than an upper surface of the second terminal assembly.

A second aspect of the present application provides a secondary battery including any of the top cover assemblies as described above.

The technical solutions provided by the present application can have at least the following beneficial technical effects:

In the top cover assembly, the protrusion formed on the top cover plate replaces the conduction block in the related art, and the lower surface of the protrusion forms the accommodation chamber so that the deformable plate covers the accommodation chamber, which can sufficiently utilize the space between the upper surface of the top cover plate and the upper surface of the second terminal assembly, increase the inner space of the secondary battery, and improve the energy density of the secondary battery; due to the protrusion, the deformation resistance of the top cover plate is further improved, and the strength of the top cover plate is also improved; further due to the protrusion, there is no need to separately weld the conduction block so that the influence of the welding of the conduction block on the deformation force of the deformable plate is avoided and the secondary battery is kept safe.

It should be understood that the above general description and the subsequent detailed description are merely exemplary, which is not intended to limit the present application.

REFERENCE SIGNS

100—top cover assembly;
10—the top cover plate;
11—main body;
12—protrusion;
122—side portion;
1221—first groove;
1222—second groove;
13—accommodation chamber;
14—through hole;
20—first terminal assembly;
21—deformable plate;
211—fixed portion;
212—deformable portion;
213—installation projection;
22—conduction piece;
221—vent hole;
222—first conduction portion;
2221—installation hole;
223—second conduction portion;
224—thinning area;
23—insulation piece;
24—fixing piece;
241—first connection portion;
242—second connection portion;
30—second terminal assembly;
31—electrode terminal;
32—conduction block;
200—housing;
300—electrode assembly.

The accompanying drawings herein are incorporated into the specification and constitute a part of the specification, showing the embodiments suitable for the present application and explaining the principles of the present application together with the specification.

DESCRIPTION OF EMBODIMENTS

The present application is further described in detail by using the specific embodiments with reference to the drawings. In the context, the terms "upper" and "lower" are used with reference to the orientation shown in FIGS. 1-9.

Figure 1:
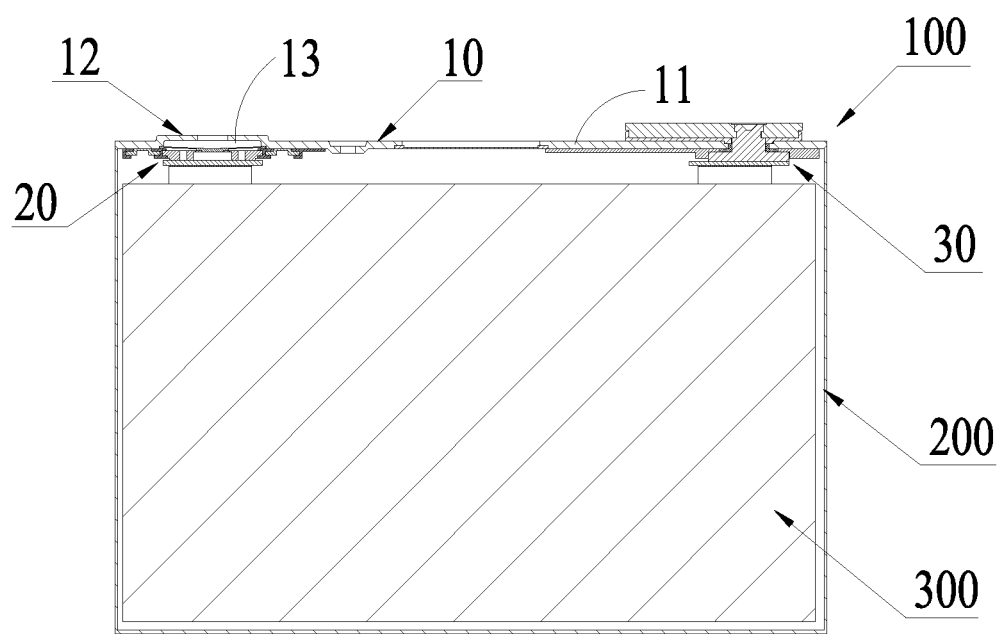
FIG. 1 illustrates a structural schematic diagram of a secondary battery according to an embodiment of the present application.

As shown in FIG. 1, an embodiment of the present application provides a secondary battery, including a top cover assembly 100, a housing 200, and an electrode assembly 300. The top cover assembly 100 includes a top cover plate 10. The top cover plate 10 is fastened to the housing 200, and the top cover plate 10 and the housing 200 cooperatively form an accommodation space inside. The electrode assembly 300 is accommodated in the accommodation space. The electrode assembly 300 includes a first electrode plate, a second electrode plate, and a separation plate between the first electrode plate and the second electrode plate.

As shown in FIGS. 2-9, the top cover plate 10 includes a main body 11 and a protrusion 12 connected with the main body 11. The protrusion 12 protrudes beyond the upper surface of the main body 11, an accommodation chamber 13 is formed below and opposite to the protrusion 12. Herein, the upper surface of the main body 11 refers to a surface of the main body 11 away from the electrode assembly 300; "below the protrusion 12" refers to "at a side of the protrusion 12 close to electrode assembly 300".

The top cover assembly 100 further includes a first terminal assembly 20. The first terminal assembly 20 includes a deformable plate 21. The deformable plate 21 is connected with the top cover plate 10, for example, connected with the main body 11 or the protrusion 12, and covers the accommodation chamber 13, that is, the deformable plate 21 faces to the accommodation chamber 13.

Generally, the top cover assembly 100 further includes a second terminal assembly 30. The upper surface of the second terminal assembly 30 is usually much higher than the main body 11. However, in the present application, the top cover assembly 100 is used and the protrusion 12 is formed on the top cover plate 10, so that the protrusion 12 replaces the conduction block in the related art, which facilitates the series or parallel connection of the secondary batteries by using the current collection member after the secondary batteries are assembled into a module. In addition, the lower surface of the protrusion 12 forms the accommodation chamber 13 so that the deformable plate 21 covers the accommodation chamber 13, which can sufficiently utilize the space between the upper surface of the top cover plate 10 and the upper surface of the second terminal assembly 30, increase the inner space of the secondary battery, and improve the energy density of the secondary battery; due to the protrusion, the deformation resistance of the top cover plate 10 is further improved, and the strength of the top cover plate 10 is also improved; further due to the protrusion 12, there is no need to separately weld the conduction block so that the influence of the welding of the conduction block on the deformation force of the deformable plate 21 is avoided and the secondary battery is kept safe.

When the secondary battery in a normal state, the first electrode plate is electrically connected with the protrusion 12 by the deformable plate 21, the second electrode plate is electrically connected with the second terminal assembly 30, and the second terminal assembly 30 is insulated from the top cover plate 10. When an inner pressure of the secondary battery exceeds a reference pressure, the deformable plate 21 can deform so that the electric connection state between the deformable plate 21 and the first electrode plate is cut off, thereby cutting off the electric connection state between the protrusion 12 and the first electrode plate.

The second terminal assembly 30 includes an electrode terminal 31 and a conduction block 32. One end of the electrode terminal 31 is connected with the second electrode plate, the other end of the electrode terminal 31 extends beyond the upper surface of the main body 11 to be connected with the conduction block 32, and both the electrode terminal 31 and the conduction block 32 are insulated from the top cover plate 10.

Generally, the second terminal assembly 30 protrudes beyond the upper surface of the main body 11, and the upper surface of the protrusion 12 is not higher than the upper surface of the second terminal assembly 30, for reducing the overall height of the secondary battery. Herein, the upper surface of the second terminal assembly 30 refers to a surface of the second terminal assembly 30 away from the electrode assembly 300.

In an embodiment of the present application, the protrusion 12 and the accommodation chamber 13 are formed by stamping. For example, the protrusion 12 and the accommodation chamber 13 are formed by stamping the lower surface of the main body 11 toward the upper surface of the main body 11, and in this manner, the protrusion 12 and the accommodation chamber 13 can be formed at the same time, thereby facilitating the manufacturing process of the top cover plate 10. The protrusion 12 and the accommodation chamber 13 can also be independently formed by mechanical cutting. No matter which method is used, the deformable plate 21 is at least partially accommodated in the accommodation chamber 13, for further improving the energy density of the secondary battery.

During deformation of the deformable plate 21, the gas inside the accommodation chamber 13 will be compressed, which in turn hinders the deformation of the deformable plate 21. In view of this, in order to reduce the deformation resistance of the deformable plate 21, a through hole 14 opposite to the deformable plate 21 is defined in the protrusion 12, and penetrates through the protrusion 12 along the thickness direction of the main body 11. For example, through hole 14 can be defined in the top portion 121 of the protrusion 12, as shown in FIGS. 8 and 9.

Figure 6:
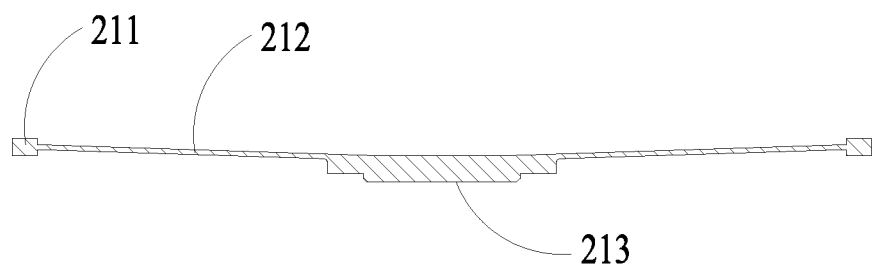
FIG. 6 illustrates a structural schematic diagram of a deformable plate in the top cover assembly according to an embodiment of the present application.

It can be understood that the deformable plate 21 seals the accommodation chamber 13. Specifically, the deformable plate 21 includes a fixed portion 211 and a deformable portion 212, the fixed portion 211 is fixed to the top cover plate 10, and the deformable portion 212 protrudes downwards. As shown in FIG. 6, the deformable portion 212 protrudes toward a side adjacent to the electrode assembly 300. In the normal state, the first electrode plate is electrically connected with the protrusion 12 by the deformable portion 212 and then the fixed portion 211; when the pressure inside the secondary battery exceeds a reference pressure, the deformable portion 212 deforms, so that the electric connection state between the deformable portion 212 and the first electrode plate is cut off. The deformable portion 212 and the fixed portion 211 can facilitate the fixation of the deformable plate 21; and the setting that the deformable portion 212 protrudes downwards can facilitate the deformation of the deformable portion 212.

Figure 8:
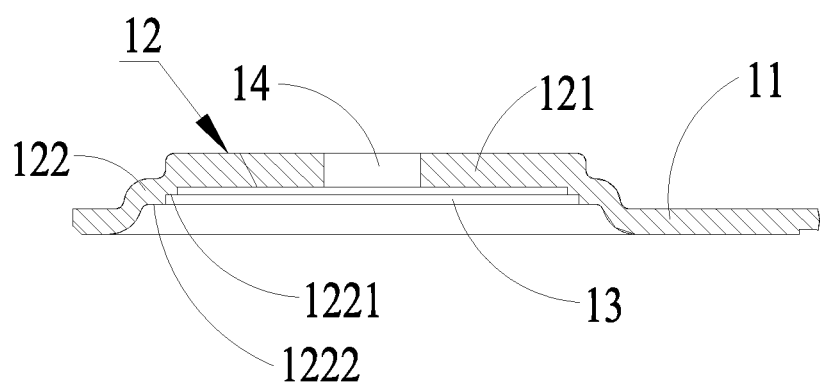
FIG. 8 illustrates a structural schematic diagram of a top cover plate in the top cover assembly according to an embodiment of the present application.
Figure 9:
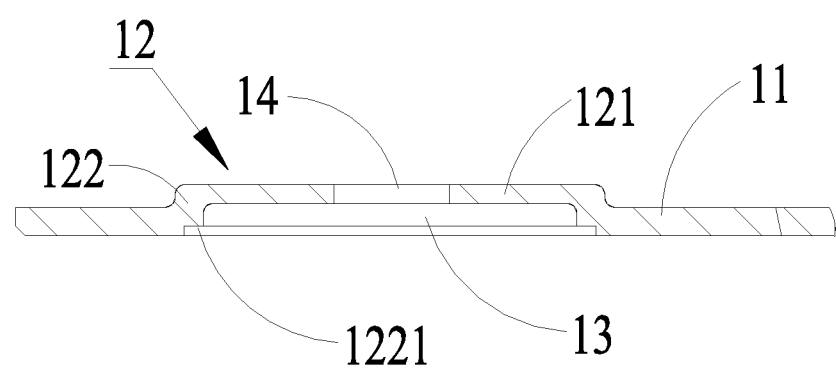
FIG. 9 illustrates a structural schematic diagram of a top cover plate in the top cover assembly according to another embodiment of the present application.

In order to further facilitate the installation of the deformable plate 21 and further increase space for setting the electrode assembly 300 and other components, the protrusion 12 includes a top portion 121 and a side portion 122, the top portion 121 is the portion of the protrusion 12 facing to the deformable plate 21, the side portion 122 is connected between the main body 11 and the top portion 121, a first groove 1221 is defined in the internal wall of the side portion 122, and as shown in FIGS. 8-9, the fixed portion 211 is accommodated in the first groove 1221. It can be understood that the first groove 1221 can be formed by a stepped surface facing the side with the electrode assembly 300. The first groove 1221 can also be an annular groove.

The deformable portion 212 can be a sheet with a circular surface, and the fixed portion 211 is connected with the periphery of the deformable portion 21.

The first terminal assembly 20 further includes a conduction piece 22 and an insulation piece 23, and the conduction piece 22 is insulated from and fixed with the top cover plate 10 by the insulation piece 23. In the normal state, the conduction piece 22 is electrically connected with the deformable plate 21, that is, the first electrode plate is electrically connected with the protrusion 12 by sequentially the conduction piece 22 and the deformable plate 21. When the inner pressure of the secondary battery exceeds the reference pressure, the deformable plate 21 deforms upwards and breaks the conduction piece 22, or, when the inner pressure of the secondary battery exceeds the reference pressure, the deformable plate 21 deforms upwards and cuts off the electric connection state between the deformable plate 21 and the conduction piece 22. The aid of the conduction piece 22 and the insulation piece 23, the electric connection between the deformable plate 21 and the first electrode plate becomes more convenient.

Figure 7:
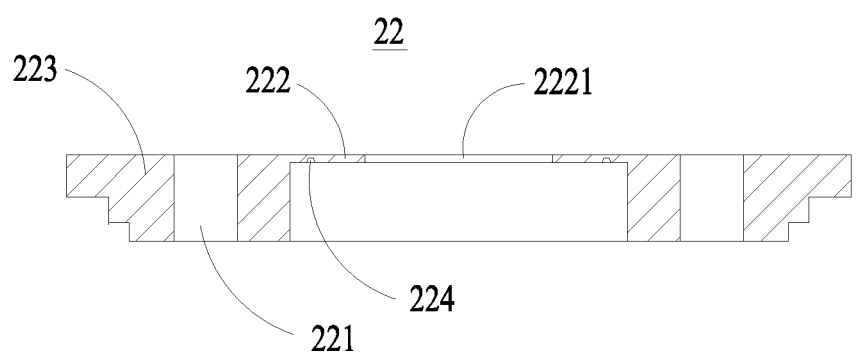
FIG. 7 illustrates a structural schematic diagram of a conduction piece in the top cover assembly according to an embodiment of the present application.

As shown in FIG. 7, a vent hole 221 facing to the deformable plate 21 is defined in the conduction piece 22, and the vent hole 221 penetrates through the conduction piece 22 in a deformation direction of the deformable plate 21, so that gas in the secondary battery can flow to the deformable plate 21 and prompt the deformable plate 21 to deform. In case that the deformable portion 212 is set, the vent hole 221 faces to the deformable portion 212, so that the gas generated in the secondary battery can rapidly arrive at the deformable portion 212. The number of the vent hole 221 can be one, two, or more.

In one embodiment of the present application, the conduction piece 22 includes a first conduction portion 222, a second conduction portion 223 and a thinning area 224. The thinning area 224 is located between the first conduction portion 222 and the second conduction portion 223, and the thickness of the thinning area is smaller than either the thickness of the first conduction portion 222 or the thickness of the second conduction portion 223. The first conduction portion 222 is connected with the deformable plate 21; the second conduction portion 223 is connected with the first electrode plate, that is, in the normal state, the deformable plate 21 is electrically connected with the first electrode plate by the first conduction portion 222, the thinning area 224 and the second conduction portion 223. With the aid of the thinning area 224, the first conduction portion 222 is connected with the deformable plate 21 while the second conduction portion 223 is connected with the first electrode plate at the same time, so that when the deformable plate 21 deforms, the thinning area 224 of the conduction piece 22 can be quickly broken, thereby realizing cutting off the inner circuit of the secondary battery. Generally, both the first conduction portion 222 and the thinning area 224 are thinner than second conduction portion 223, thereby facilitating the break of the thinning area 224.

Further, in order to break the conduction piece 22 with a small tensile force, the thinning area 224 may have both an indentation and a broken portion, or have an indentation or a broken portion. When the thinning area 224 has the broken portion, the first conduction portion 222 and the second conduction portion 223 will be disconnected from each other at the broken portion.

The conduction piece 22 may not include the thinning area 224, but only include the first conduction portion 222 and the second conduction portion 223. In that case, in the normal state, the deformable plate 21 directly contacts or abuts against the first conduction portion 222 to realize electric connection therebetween; the electric connection between the deformable plate 21 and the first electrode plate is realized in a manner that the deformable plate 21 is electrically connected to the first conduction portion 222 and the first conduction portion 222 is electrically connected to the second conduction portion 223; when the deformable plate 21 deforms, the deformable plate 21 directly breaks away from the first conduction portion 222 so that the electric connection between the deformable plate 21 and the first electrode plate.

Figure 3:
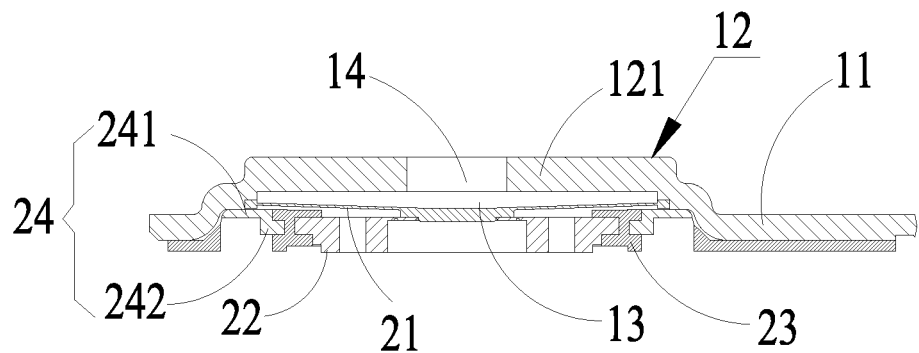
FIG. 3 illustrates a structural schematic diagram of a first terminal assembly in the top cover assembly shown in FIG. 2, according to an embodiment of the present application.
Figure 5:
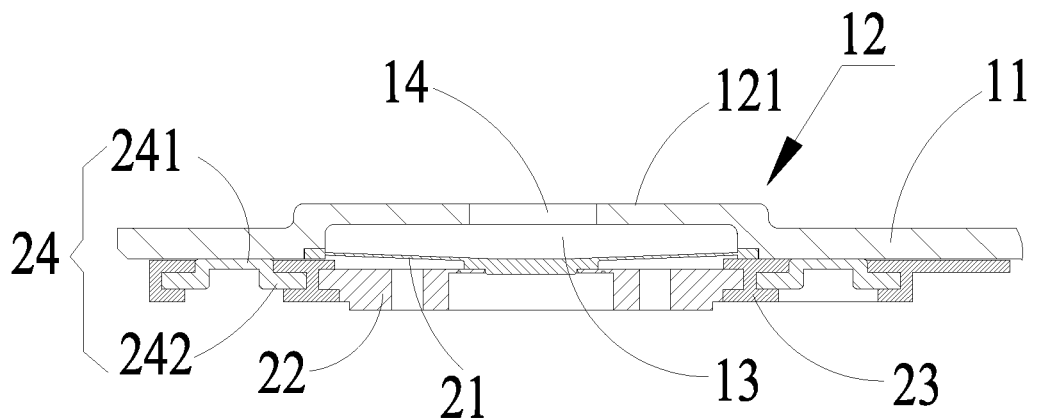
FIG. 5 illustrates a structural schematic diagram of a first terminal assembly in the top cover assembly shown in FIG. 4, according to an embodiment of the present application.

Further, an installation hole 2221 is defined in the first conduction portion 222, and the deformable plate 21 includes an installation projection 213. In the solution with the deformable portion 212, the installation projection 213 can be connected with a side of the deformable portion 212 close to the conduction piece 22, and preferably, the installation projection 213 is in the middle area of the deformable portion 212; thus, in the normal state, the installation projection 213 is inserted into the installation hole 2221, which improves the connection preciseness between the conduction piece 22 and the deformable plate 21, thereby breaking the conduction piece 22 under the preset tensile force. The installation hole 2221 can be a blind hole or a through hole. In the case that the installation hole 2221 is a through hole, the installation hole 2221 can also be used as the vent hole 221. In order to improve reliability of the electric connection between the first conduction portion 222 and the deformable plate 21, the deformable portion 212 is connected with the first conduction portion 222 by overlapping on the first conduction portion 222, that is, the deformable portion 212 can have an overlapping surface, and the overlapping surface overlaps on the first conduction portion 222, as shown in FIGS. 3 and 5. In the case that the conduction piece 22 includes the thinning area 224, the installation hole 2221 and the installation projection 213 can also be present.

Or in the normal state, the conduction piece 22 is directly connected to the deformable plate 21 by welding. The welding position of the conduction piece 22 and the deformable plate 21 is a thin and weak area therebetween. Thus, when the inner pressure of the secondary battery exceeds the reference pressure, the deformable plate 21 deforms, and fracture occurs at the welding position between the conduction piece 22 and the deformable plate 21 so that the electric connection between the deformable plate 21 and the conduction piece 22 is cut off.

In the above embodiments, the conduction piece 22 can be placed outside the accommodation chamber 13. In order to sufficiently utilize the inner space of the accommodation chamber 13, the conduction piece 22 is at least partially accommodated in the accommodation chamber 13, and at the same time the insulation piece 23 is at least partially accommodated in the accommodation chamber 13, as shown in FIGS. 3 and 5. Or, only one of the conduction piece 22 and the insulation piece 23 is accommodated in the accommodation chamber 13.

The connection between the insulation piece 23 and the conduction piece 22 can be realized by clamping, insertion or adhering. The insulation piece 23 can be directly or transitionally connected to the top cover plate 10.

Optionally, the first terminal assembly 20 further includes a fixing piece 24, the insulation piece 23 is fixed with the top cover plate 10 by the fixing piece 24. With the aid of the fixing piece 24, the connection between the insulation piece 23 and the top cover plate 10 becomes more convenient.

The fixing piece 24 may include a first connection portion 241 connected to the top cover plate 10, and a second connection portion 242 connected to the insulation piece 23. The first connection portion 241 and second connection portion 242 together form a bending structure, as shown in FIGS. 3 and 5.

Further, the number of the second connection portion 242 may be one, as shown in FIG. 3; or two, the two second connection portions 242 are connected to the two ends of the first connection portion 241, respectively, that is, the fixing piece 24 is shaped like a Chinese character "n" (i.e., a similar n-shaped structure the two legs of which extend outwardly and form two flanges), and both the two second connection portions 242 are inserted into the insulation piece 23, as shown in FIG. 5.

However the fixing piece 24 is structured, the manner that the fixing piece 24 is connected to the insulation piece 23 can be adhering, embedding or clamping. Preferably, the fixing piece 24 is embedded into the insulation piece 23. Generally, the insulation piece 23 is a plastic member formed by injection molding. In order to improve reliability of connection between the insulation piece 23 and the fixing piece 24, it is preferable that the insulation piece 23 and the fixing piece 24 are molded integrally, especially in the case that the fixing piece 24 is shaped like a Chinese character "n".

Figure 2:
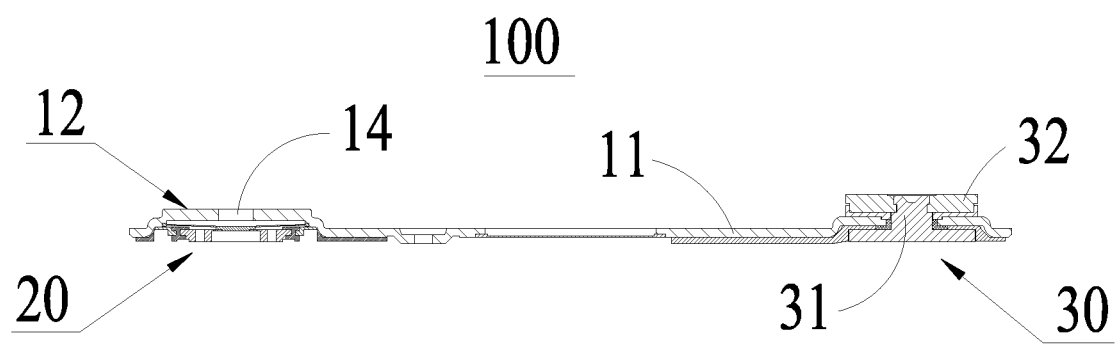
FIG. 2 illustrates a structural schematic diagram of a top cover assembly according to an embodiment of the present application.

Further, in order to increase utilization of the first terminal assembly 20 to the space between the main body 11 and the upper surface of the second terminal assembly 30, a second groove 1222 is further defined in the internal wall of the side portion 122, especially in the case that the number of the second connection portion 242 is merely one, as shown in FIGS. 2-3, the fixing piece 24 is accommodated in the second groove 1222. The second groove 1222 may be placed below the first groove 1221 and surrounding the first groove 1221. Optionally, the second groove 1222 may also be formed by a stepped surface facing toward a side with the electrode assembly 300.

In a preferable embodiment, the bottom surface of the second groove 1222 is higher than the upper surface of the main body 11, that is, the bottom surface of the second groove 1222 is farther away from the electrode assembly 300 than the upper surface of the main body 11, so that components of the first terminal assembly 20 will be positioned at most in the space between the upper surface of the main body 11 and the upper surface of the second terminal assembly 30, thereby improving utilization of the inner space of the secondary battery. Herein, the bottom surface of the second groove 1222 refers to a surface of the second groove 1222 facing the electrode assembly 300.

Figure 4:
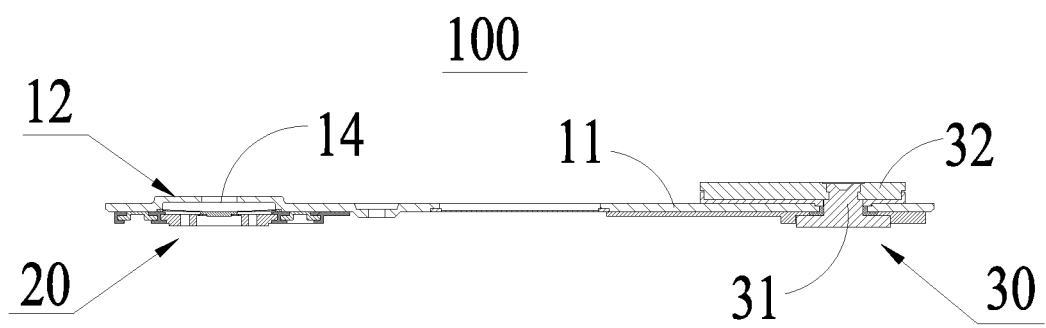
FIG. 4 illustrates a structural schematic diagram of a top cover assembly according to another embodiment of the present application.

It should be noted that the protrusion 12 may include only the first groove 1221 or only the second groove 1222. In the case that the protrusion 12 does not include the second groove 1222, the first connection portion 241 can be directly connected to the lower surface of the main body 11, as shown in FIGS. 4-5.

The above are merely preferred embodiments of the present application, and are not used to limit the present application. For those skilled in the art, various modifications and changes can be made to the present application. Any modification, equivalent substitution, or improvement within the spirit and principles of the present application shall fall into the protection scope of the present application.

What is claimed is:

1. A top cover assembly of a secondary battery, comprising:
    a top cover plate, the top cover plate comprising a main body and a protrusion integrally formed with the main body, the protrusion protruding beyond an upper surface of the main body, an accommodation chamber being defined below the protrusion, the protrusion facing the accommodation chamber; and
    a first terminal assembly, the first terminal assembly comprising a deformable plate, a conduction piece, an insulation piece, and a fixing piece, wherein the deformable plate covers the accommodation chamber and comprises a fixed portion and a deformable portion, the fixed portion is fixed to the top cover plate, and the deformable portion protrudes downwards; the conduction piece is insulated from and fixed with the top cover plate by the insulation piece, and the insulation piece is fixed to the top cover plate by the fixing piece; the conduction piece is electrically connected to the deformable plate; and the deformable plate is configured to deform in response to an increase of an internal pressure of the secondary battery, to break the conduction piece or cut off an electric connection state between the deformable plate and the conduction piece;
    wherein the protrusion comprises a top portion and a side portion, the side portion is integrally formed between the main body and the top portion, a first groove and a second groove are defined in an internal wall of the side portion, and the second groove surrounds the first groove and is located below the first groove; and
    wherein the fixed portion is accommodated in the first groove, and the fixing piece is accommodated in the second groove.

2. The top cover assembly of a secondary battery according to claim 1, wherein a bottom surface of the second groove is higher than the upper surface of the main body.

3. The top cover assembly of a secondary battery according to claim 1, wherein the conduction piece is at least partially accommodated in the accommodation chamber, and the insulation piece is at least partially accommodated in the accommodation chamber.

4. The top cover assembly of a secondary battery according to claim 1, wherein the protrusion and the accommodation chamber are formed by stamping, and the deformable plate is at least partially accommodated in the accommodation chamber.

5. The top cover assembly of a secondary battery according to claim 1, the top cover assembly further comprising a second terminal assembly, wherein the second terminal assembly protrudes beyond the top cover plate, and an upper surface of the protrusion is not higher than an upper surface of the second terminal assembly.

6. A secondary battery, comprising the top cover assembly according to claim 1.

7. The secondary battery according to claim 6, wherein a bottom surface of the second groove is higher than the upper surface of the main body.

8. The secondary battery according to claim 6, wherein the conduction piece is at least partially accommodated in the accommodation chamber, and the insulation piece is at least partially accommodated in the accommodation chamber.

9. The secondary battery according to claim 6, wherein the protrusion and the accommodation chamber are formed by stamping, and the deformable plate is at least partially accommodated in the accommodation chamber.

10. The secondary battery according to claim 6, wherein the top cover assembly further comprises a second terminal assembly, wherein the second terminal assembly protrudes beyond the top cover plate, and an upper surface of the protrusion is not higher than an upper surface of the second terminal assembly.

\* \* \* \* \*